S. E. Bolles.
Stump Elevator.
No. 1,070. Reissued Nov. 6, 1860.
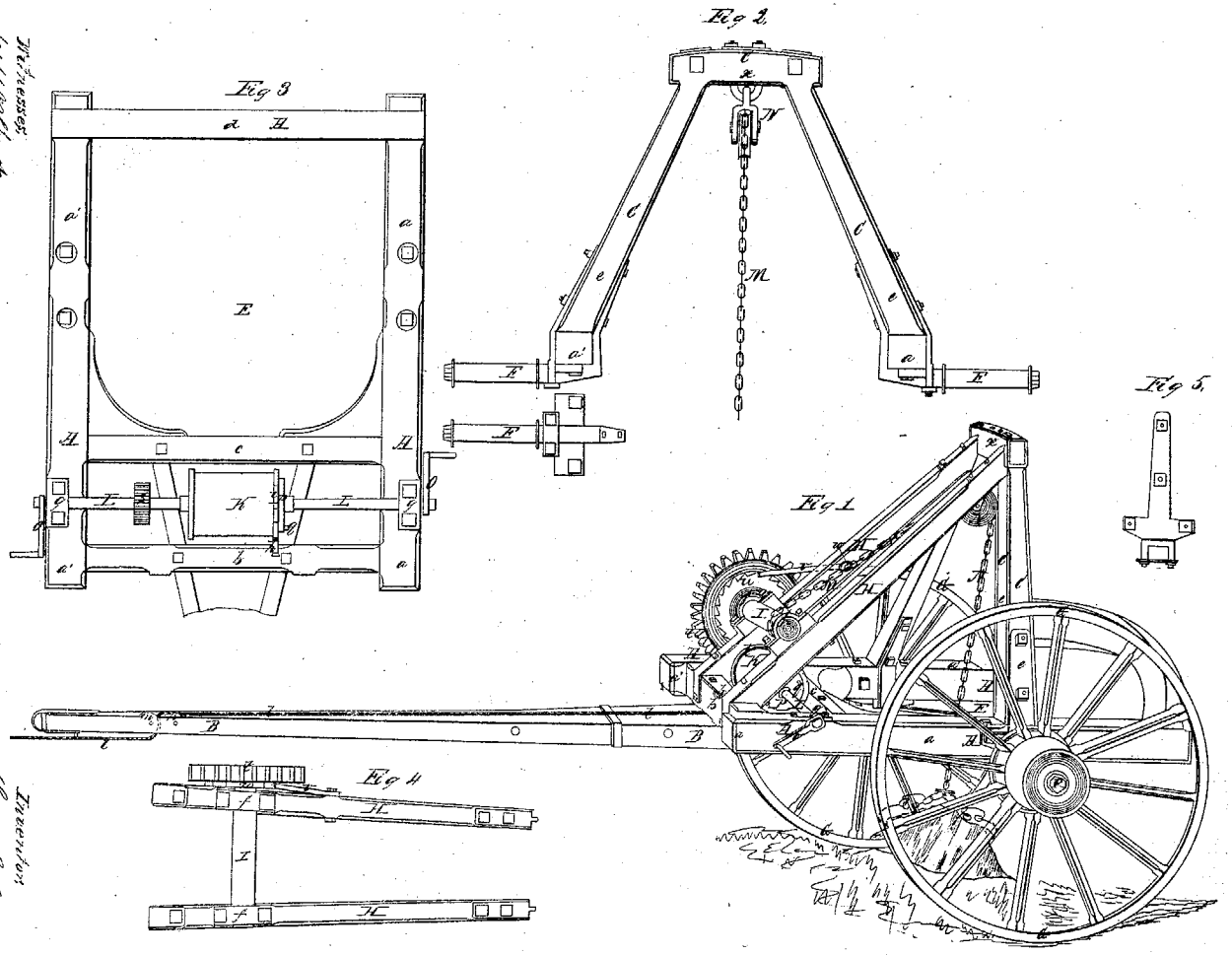
Witnesses,
Joseph W. Church
Thomas Ellis
Inventor,
Solomon E. Bolles
AM. PHOTO-LITHO. CO. N.Y. (OSBORNE'S PROCESS)

UNITED STATES PATENT OFFICE.

SOLOMON E. BOLLES, OF MATTAPOISETT, MASSACHUSETTS.

IMPROVED MACHINE FOR RAISING AND TRANSPORTING STONES.

Specification forming part of Letters Patent No. 12,666, dated April 10, 1855; Reissue No. 1,070, dated November 6, 1860.

*To all whom it may concern:*

Be it known that I, SOLOMON E. BOLLES, late of Rochester, in the county of Plymouth and State of Massachusetts, but now residing in Mattapoisett, in the said county and State, have invented a new and useful or improved machine for lifting and transporting stones and laying them in walls or otherwise depositing them; and I do hereby declare the same to be fully described in the following specification, and illustrated in the accompanying drawings, of which—

Figure 1 is a perspective view of it. Fig. 2 is an elevation of its derrick, and exhibits the two separate wheel journals or axles and a section of the bed-frame upon which the derrick is supported. Fig. 3 is a top view of the said bed-frame and the auxiliary windlass applied to it. Fig. 4 is a top view of the derrick braces or struts and the main windlass applied thereto. Fig. 5 is a front view of one of the iron or metallic braces by which the derrick, the bed-frame, and wheel axle or journal are secured together. Fig. 6 is an under-side view of one of the said journals or axles.

The nature of my invention consists in an improved arrangement of derrick, open bed-frame, and two separate wheel axles or journals; also, in a combination and arrangement of an auxiliary windlass and its line pawl and ratchet, or mechanical equivalents therefor, with the main windlass, the crank-shaft, and their operating-gears.

In the drawings, A is the bed-frame, which consists of a strong rectangular frame constructed of two side timbers, *a a'*, and three connecting-timbers, *b c d*, arranged as shown in Fig. 3, such frame being provided with a tongue or pole, B, for the application of a span of horses or yoke of oxen to the machine.

A derrick, C, is elevated directly over the middle of the open space E, which is between the timbers *c* and *d*, the two posts or inclined timbers *e e* of such derrick, being stepped, respectively, in the side timbers, *a a'*, of the bed-frame.

Two wheel axles or journals, F F, are so arranged as to project in opposite directions from the bed-frame in manner as shown in the drawings, their axes being in a vertical plane passing transversely across the bed-frame and through the middle of the derrick. Each of these axles or journals receives one of two wheels, G G, such wheels being arranged with respect to the bed-frame as shown in Fig. 1.

The derrick is further supported on the bed-frame by two struts or braces, H H, which extend from the cross bar or timber *b* to the head or upper end of the derrick, and serve to support the boxes *f f* of the journals of the shaft of a windlass, I, below which an auxiliary windlass, K, is arranged, the shaft L of the said auxiliary windlass being supported in boxes *g g*, bolted to and resting on the bed-frame. The auxiliary windlass revolves loosely on its shaft, and is provided with a pawl or click, *h*, which is extended from the bed-frame and plays into a ratchet, *i*, fixed on the end of the said windlass. A rope or line, *l*, is attached at one of its ends to the windlass, and after being wound several times around it is led forward along the tongue B, and thence downward through it at or near its front end, the said rope in its passage through the tongue being supported against two sheaves or rollers, *m n*, arranged on the tongue. The rope, on being led from the tongue, may, when the machine is in use, have one or more draft-animals applied to it for the purpose of effecting draft on such rope in order to cause the auxiliary windlass to be rotated by the rope.

Besides two cranks, *o o*, affixed to its opposite ends, (see Fig. 3,) the shaft L carries a circular wheel or head, *p*, which is placed against one end of the auxiliary windlass. A bolt or pin, *q*, extends through the head *p* and into the windlass, and may be withdrawn from the two, as occasion may require. While in place, as described, such pin serves to so lock the windlass to the head *p* as to enable the former to be revolved by the shaft L, in order to wind the rope on the windlass. The ratchet *i* and pawl *h* are to prevent the rope from being unwound from the auxiliary windlass while the shaft L may be in the act of being revolved by men or operators acting on either or both of its cranks. Furthermore, the shaft L has a pinion-gear, *s*, affixed to it, such pinion being made to engage with a larger gear, *t*, fixed on the shaft of the main windlass I. A ratchet, *u*, is fixed to the side of the gear *t*, and receives a pawl, *v*, extended from a pin, *w*, that projects from and extends through one of the struts of the derrick. From the windlass I a chain, M, extends to and through a tackle-block, N, suspended from the head *x* of the derrick. When the machine is at work in lifting a stone from the earth, the said chain, at its lower end, is to be affixed to or suitably connected with the stone, and this by means of claws or by pins inserted in holes drilled in opposite sides of the stone.

The arrangement of the derrick, the open bed-frame, and the two separate shafts or journals of the wheels is peculiarly favorable for enabling the great strain or weight of a stone to be sustained in a vertical plane passing directly through the middle of the derrick and the axes of the wheels. Furthermore, the derrick constitutes an arch to brace the bed-frame under the pressure of a load while the said frame is upheld by the wheels and axles. The axles are separate, so that there is a clear space between them, they not being connected by any bar extending across the frame and directly under the derrick.

In operating with the machine, after it may have been brought over a stone and had its chain affixed thereto, workmen are to lay hold of and turn the cranks of the auxiliary windlass. At the same time, if oxen or draft-animals are caused to draw on the line of such windlass, we thus, by such means, will be enabled to exert in conjunction with the manual power, and for effecting the rotation of the main windlass, an additional and superior force, the machine, by its peculiar construction, being able to raise out of the ground or from it a very massive stone, and subsequently to transport such stone to any required distance and deposit it in a wall, or where it may be required to be placed.

After the stone may have been raised from its bed the rope may be re-coiled around the auxiliary windlass. To do this it will be necessary to unlock the windlass from its shaft and revolve such windlass by manual power.

I claim—

1. My improved stone-carriage or arrangement of derrick C, open bed-frame A, and two separate or disconnected wheel axles or journals, substantially as specified.

2. The combination and arrangement of the auxiliary windlass K, its line *l*, pawl *h*, and ratchet *i* (or mechanical equivalents therefor) with the main windlass I, the crank-shaft L, and their working-gears *s t*, the whole being to enable the machine to be operated substantially as specified.

SOLOMON E. BOLLES.

Witnesses:

JOSEPH W. CHURCH,
THOMAS ELLIS.